(12) United States Patent
Durand

(10) Patent No.: US 8,784,139 B2
(45) Date of Patent: Jul. 22, 2014

(54) PUSH-PULL INTERCONNECTION SYSTEM

(75) Inventor: Renaud Durand, Grenoble (FR)

(73) Assignee: Radiall, Rosny Sous Bois (FR)

(*) Notice: Subject to any disclaimer, the term of this patent is extended or adjusted under 35 U.S.C. 154(b) by 11 days.

(21) Appl. No.: 13/513,967

(22) PCT Filed: Dec. 17, 2010

(86) PCT No.: PCT/IB2010/055908
§ 371 (c)(1),
(2), (4) Date: Jul. 13, 2012

(87) PCT Pub. No.: WO2011/073953
PCT Pub. Date: Jun. 23, 2011

(65) Prior Publication Data
US 2012/0282819 A1    Nov. 8, 2012

(30) Foreign Application Priority Data
Dec. 17, 2009 (FR) ..................... 09 59137

(51) Int. Cl.
*H01R 13/508* (2006.01)

(52) U.S. Cl.
USPC ........................................ 439/695

(58) Field of Classification Search
USPC ............... 439/695, 157, 680; 385/86, 71, 55
See application file for complete search history.

(56) References Cited

U.S. PATENT DOCUMENTS

| | | | |
|---|---|---|---|
| 6,920,050 B2* | 7/2005 | Little et al. ................. 361/736 |
| 7,211,739 B1* | 5/2007 | Brigham et al. ............. 174/359 |
| 7,338,214 B1* | 3/2008 | Gurreri et al. ............... 385/55 |
| 7,422,456 B1* | 9/2008 | Mitani et al. ................ 439/248 |
| 7,484,896 B2* | 2/2009 | DeCusatis et al. ........... 385/53 |
| 7,507,105 B1* | 3/2009 | Peters et al. ................ 439/374 |
| 7,959,467 B2* | 6/2011 | Sasser et al. ............ 439/607.19 |
| 8,465,311 B2* | 6/2013 | Takamatsu ................. 439/247 |
| 2002/0009905 A1* | 1/2002 | Poplawski et al. ........ 439/76.1 |
| 2004/0047565 A1* | 3/2004 | Cheng et al. ................ 385/71 |
| 2004/0157499 A1* | 8/2004 | Nania et al. ................. 439/680 |
| 2005/0232551 A1* | 10/2005 | Chang et al. ................ 385/76 |
| 2007/0047877 A1* | 3/2007 | Pepe ........................ 385/86 |
| 2007/0128901 A1* | 6/2007 | Schmidt ..................... 439/157 |

FOREIGN PATENT DOCUMENTS

| | | |
|---|---|---|
| DE | 199 18 339 A1 | 10/1999 |
| EP | 1 657 576 A2 | 5/2006 |
| EP | 1 993 174 A1 | 11/2008 |
| WO | WO 2009/100796 A1 | 8/2009 |

OTHER PUBLICATIONS

International Search Report issued in International Application No. PCT/IB2010/055908 dated Sep. 1, 2011 (w/ partial translation).
Written Opinion of the International Searching Authority issued in International Application No. PCT/IB2010/055908 dated Sep. 1, 2011 (w/ translation).
French Partial Preliminary Search Report issued in French Application No. 0959137 dated Aug. 3, 2010 (w/ partial computer-generated translation).
French Written Opinion issued in French Application No. 0959137 dated Aug. 3, 2010 (w/ partial computer-generated translation).

* cited by examiner

*Primary Examiner* — Alexander Gilman
(74) *Attorney, Agent, or Firm* — Oliff PLC

(57) ABSTRACT

A plug that includes at least one contact connected to a cable, and a body extending according to a longitudinal axis having the contact housed therein. The contact is supported by a mounting that is translatably mobile inside the body.

16 Claims, 10 Drawing Sheets

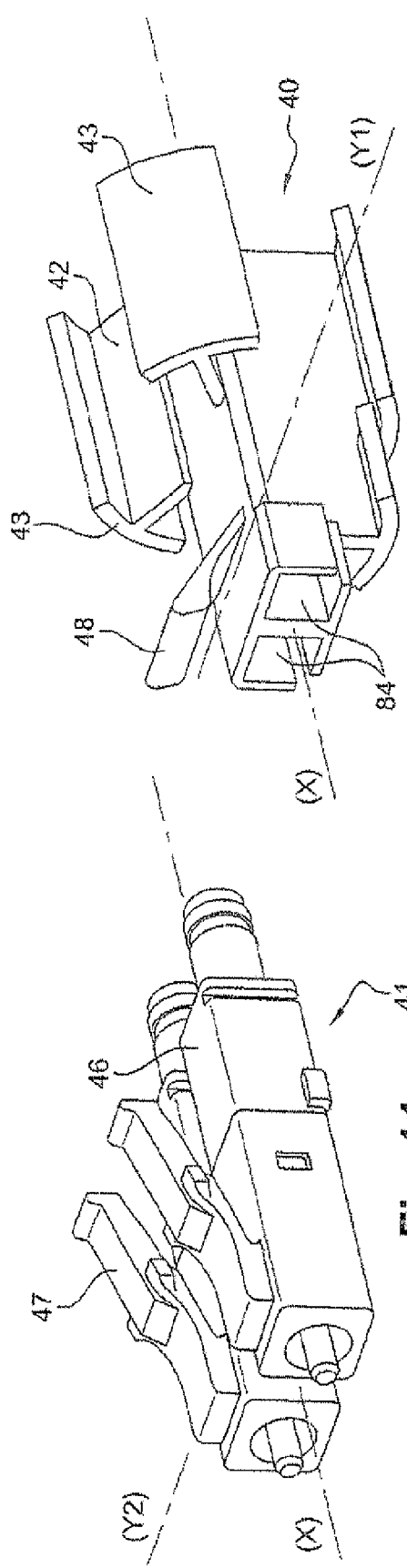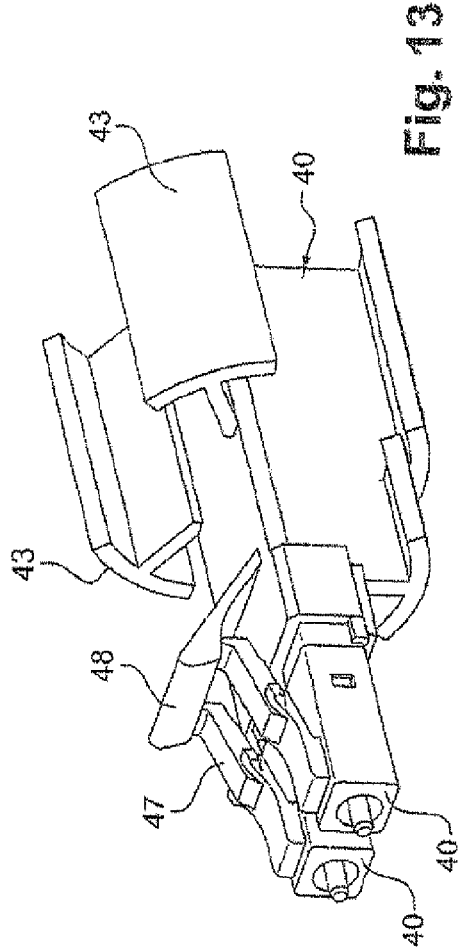

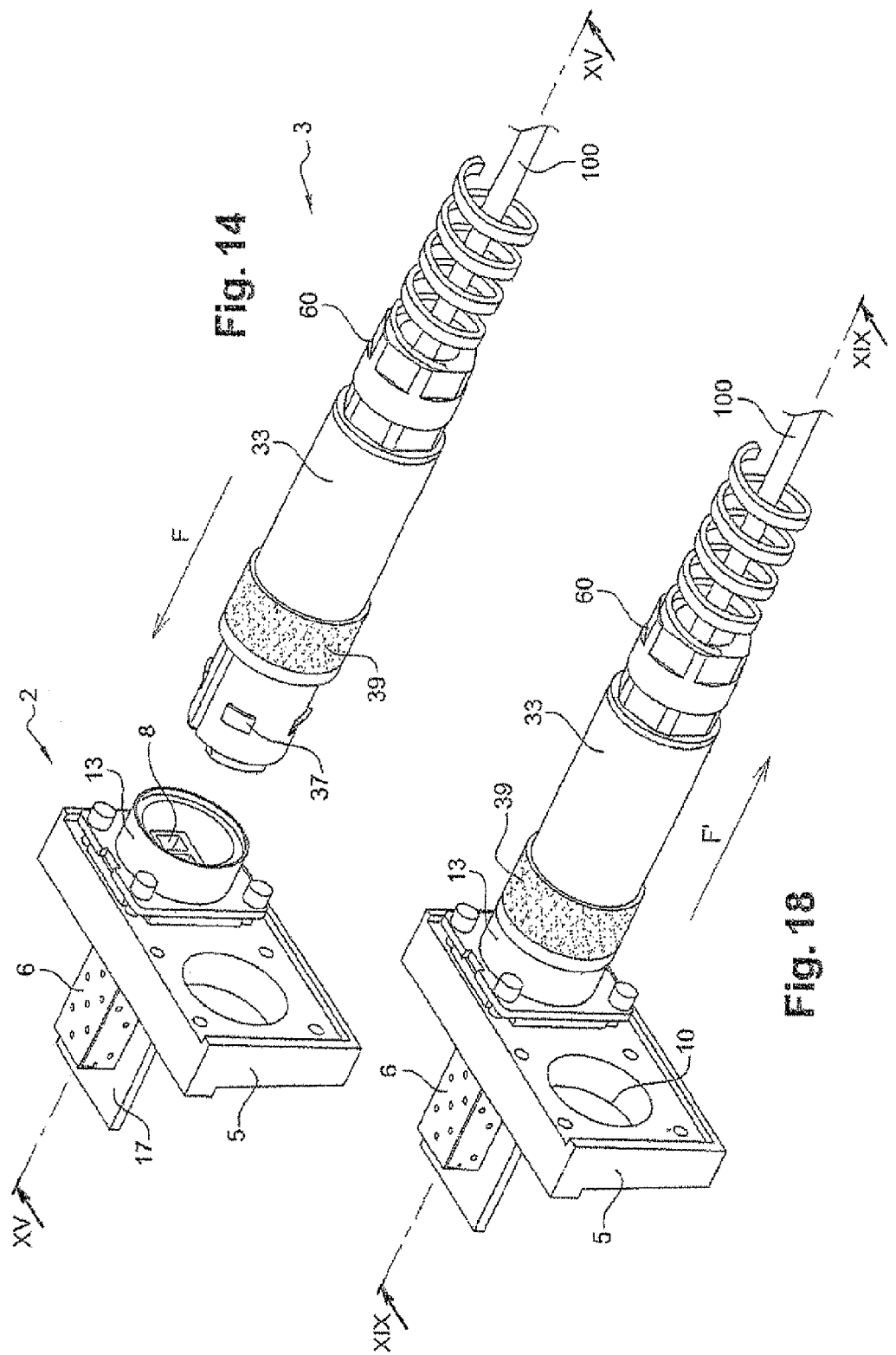

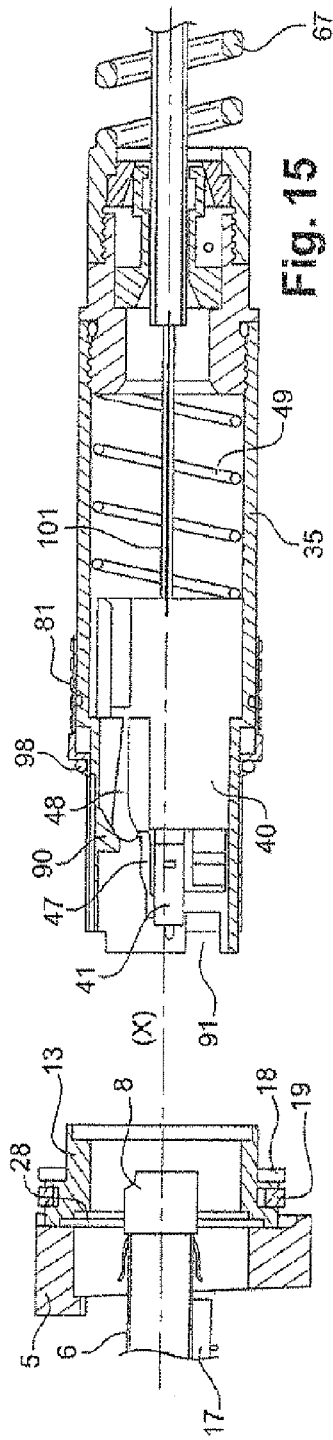
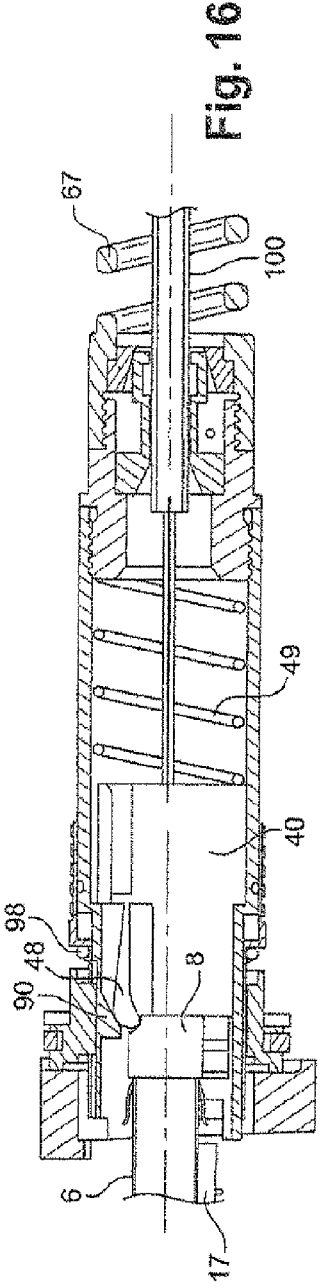
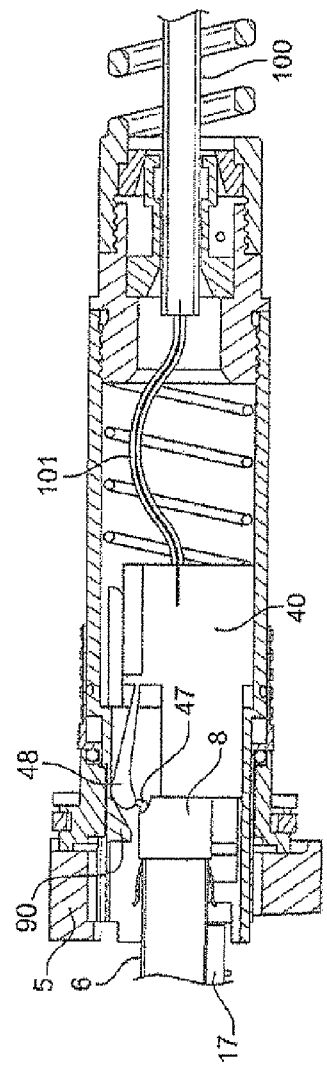
Fig. 15
Fig. 16
Fig. 17

PUSH-PULL INTERCONNECTION SYSTEM

BACKGROUND

The present invention provides an interconnection system, notably for Ethernet applications in a severe outdoor environment.

Such an interconnection system may be adapted to different connection interfaces such as Duplex LC, RJ45, USB and other connectors.

The interconnection system includes a plug and a socket, the socket being mounted on the chassis of a customer equipment including an electronic component received in a casing, for example.

The position of the casing relative to the socket may not be strictly the same from one assembly to another, for example because of different positions of the casing and different types of customer equipment, a tolerance of the order of one millimeter with regard to the coordinates of the position of the casing in a plane containing the chassis being acceptable, while the tolerance for the coordinate of the position of the casing in a direction perpendicular to said plane may be as much as several millimeters, this coordinate being referred to hereinafter as the "depth". Thus the casing may be placed differently relative to the socket from one customer assembly to another.

The contacts of the plug according to U.S. Pat. No. 7,338,214 being fixed relative to the rest of the plug, they may be unsuitable for a connection to the electronic components of some customer assemblies because of the particular position of the casings receiving them relative to the socket.

To solve this problem, the application WO 2009/100796 proposes a plug in which the contacts are mounted in a floating manner in a hollow body to allow manual connection of the contacts to the electronic component taking into account the depth of said electronic component in the chassis. However, the use of such a plug necessitates a non-negligible manipulation time for an operator to make the connection to the electronic component and this connection cannot be made blind. Furthermore, such a plug does not allow compensation of the variations in the position of the casing receiving the electronic component relative to the socket in the direction of dimensions other than the depth.

Application US 2007/0128901 discloses a connector comprising a support to accept contacts connected to an electric cable, the connector comprising a body within which the support is housed.

U.S. Pat. No. 7,422,456 discloses a connector with a fixed part with respect to which an internal conductor and an external conductor are translationally mobile. This U.S. Pat. No. 7,422,456 does not describe any translationally mobile support carrying the conductors.

U.S. Pat. No. 7,338,214 and application US 2007/0047877 teach the creation of two lugs on one and the same optical contact, these two lugs being mounted to pivot relative to one another. These documents do not teach the creation of a first lug on a support carrying one optical contact with a second lug on the contact, the first and second lugs being able to come into contact with one another when the contact is mounted on the support.

There is a need for a system allowing the connection of a plug to an electronic component of a customer equipment carried by a chassis fastened to a socket despite existing tolerances in three dimensions with respect to the position of the casing receiving the component relative to the socket, these connection and disconnection operations preferably having to be simple, fast and possible to carry out blind.

SUMMARY

An objective of the invention is to meet this requirement and one aspect of the invention does so thanks to a plug including:
  at least one contact connected to a cable, and
  a body extending along a longitudinal axis and inside which the contact is received,
characterized in that the contact is carried by a support mobile in translation in the body.

The movement of the contact in the body allows compensation of the tolerance with regard to the depth of the position relative to the socket of a casing receiving the electronic component to which the plug may be connected.

The plug advantageously includes means inside the body exerting a return force adapted to move the contact along the axis of the body.

The return force exerted on the contact allows the aforementioned movement.

The body is for example configured to receive one, two or more than two contacts. The contacts may be optical contacts, notably LC contacts, or other types of contact, such as RJ45, USB or other contacts.

The cable is advantageously an optical cable.

The means exerting the return force advantageously include a spring having one end connected to the body and another end connected to the support.

This spring may be a compression spring, for example.

The contact advantageously includes a lug mounted to pivot relative to the rest of the contact and the support advantageously includes a lug mounted to pivot relative to the rest of the support, the lug of the contact and the lug of the support being adapted to come into contact with each other when the contact is mounted in the support.

That part of the contact that carries said lug and that part of the support that carries the other said lug can be configured in such a way that they can be moved one relative to the other.

The body advantageously includes at one longitudinal end an area including at least one raised portion that projects toward the interior of the body, said raised portion and the lug of the support being adapted to come into contact with each other in at least one position of the support in the body. In other words, there may be positions of the support in the body in which said raised portion exerts no force on said lug of the support.

The body may be configured to extend beyond the contacts for any position of the support in the body in order to protect the contacts during connection and/or disconnection operations.

The aforementioned configuration of the lugs of the contact and the support and the aforementioned configuration of the area including the raised portion that projects inward allows simplification of the operations of connecting and/or disconnecting the plug to/from the socket of an assembly including the electronic component.

The support advantageously includes at least one arm extending along the axis of the body and having an end surface cooperating with guides provided in the interior wall of the body, such an arm guiding and thus facilitating movement of the support in the body.

The plug advantageously includes a system for retaining the plug on the cable, for example a gland. The gland advantageously includes two retaining members of complementary shape, for example two half-members, and a member for clamping said two members. The gland advantageously includes a nut including a front part intended to be mounted on the body and a flexible rear part. The gland may include a split annular seal pressed against the cable.

Such a gland allows the production of a sealed mechanical connection between the plug and the cable at the same time as accompanying flexing of the cable.

The plug is advantageously configured to receive the various types of contact referred to above interchangeably.

Another aspect of the invention provides an assembly adapted to be connected to the plug described hereinabove, the assembly including:

a customer equipment including a chassis and a casing adapted to receive an electronic component, said casing being carried by the chassis, defining a housing and being disposed facing an opening in the chassis, and a socket including a tubular portion, a fixing plate for fixing it to the chassis and a cover adapted to obstruct the tubular portion, characterized in that the cover includes a peg adapted to extend toward the tubular portion when the cover is in place thereon, the peg being configured to cooperate with the housing of the casing to allow centring of the socket relative to the casing.

The cooperation of the peg of the cover and the housing of the casing may allow dispensing with tolerances in respect of the position of the casing in the opening of the chassis in the plane of the chassis.

The peg is advantageously configured to be received inside the housing of the casing.

The peg is advantageously removably mounted on the rest of the cover.

The tubular portion of the socket and the fixing plate may be made in one piece.

A further aspect of the invention provides an interconnection system including:

a plug as defined above, and
   an assembly as defined above.

The area of the body of the plug including the raised portion that projects toward the interior of the body advantageously includes a raised portion that projects toward the exterior of the body and the tubular portion of the socket advantageously includes a groove into which said raised portion may clip on connection of the plug and the assembly, which may allow retention of the plug on the assembly.

The interconnection system is advantageously configured so that once the connection of the plug and the socket has been made, the support is in the body in a position in which the plug of the contact is released, i.e. the lug of the contact is not subjected to any exterior stress.

For example, without this being limiting on the invention, the lug of the contact remains stressed because of the configuration of the area of the body including the raised portion, the lug of the support, the lug of the contact and the means for exerting a return force, the aforementioned configuration being for example such that, when a force is applied to the plug connected to the assembly, said means retain the support in a position in which, via the lug of the support, the raised portion retains the lug of the contact in a position allowing the connection of the contact to a connection interface of the customer equipment of the assembly and, once this connection has been made, moving the support in the body into a position in which the lug of the contact is released.

Alternatively, the lug of the contact is stressed only when it comes into contact with the connection interface of the customer equipment of the assembly.

The areas of the body including the raised portion, the lug of the support, the lug of the contact and the means for exerting a return force are advantageously configured so that when a traction force is applied to the plug to disconnect it from the assembly the support is moved in the body to a position in which, via the lug of the support, said raised portion retains the lug of the contact in a position allowing it to be disconnected from the assembly.

The body of the plug, respectively the socket, advantageously includes at least one rib and the socket, respectively the body of the plug, advantageously includes at least one groove, the groove and the rib being configured to provide polarization on connecting the plug to the assembly.

The groove advantageously extends over only part of the length of the body of the plug or the socket, the closed end of the groove defining an abutment position on connecting the plug to the assembly.

The interconnection system of the invention may allow connection, respectively disconnection, of the plug and the assembly in a reduced number of steps, notably a single step, as well as being robust and having satisfactory electromagnetic properties.

The plug may have a protection index as defined by the International Electrotechnical Commission of IP67 or IP68.

Such an interconnection system may be supplied in kit form and easily assembled by a user without specialist tools.

A further aspect of the invention provides a method of mounting a socket on the chassis of a customer equipment, the socket including a tubular portion, a fixing plate and a cover adapted to obstruct the tubular portion and including a peg adapted to extend toward the tubular portion when the cover is in place thereon, and the chassis carrying a casing facing an opening of the chassis, the casing defining a housing, in which method:

the socket is disposed against the chassis so that the peg cooperates with the housing of the casing, and
   the socket so disposed is fastened to the chassis.

The socket is advantageously disposed against the chassis so that the peg of the cover is received inside the housing of the casing.

A further aspect of the invention provides a gland configured to retain a plug on a cable, characterized in that it includes on the cable two retaining members of complementary shape.

The gland advantageously includes a member for clamping said two members, a nut including a front part adapted to be mounted on the body of the plug and a flexible rear part. The gland advantageously includes an annular split seal pressed against the cable.

BRIEF DESCRIPTION OF THE DRAWINGS

Other advantageous properties and features of the invention may be clearer after reading the following description of nonlimiting embodiments of the invention and examining the appended drawings, in which:

FIG. 11 represents an example of contacts of the invention, FIG. 12 represents an example of a support for receiving the FIG. 11 contacts, FIG. 13 represents the FIG. 12 support when the FIG. 11 contacts have been mounted on it, FIG. 14 represents diagrammatically an operation of connecting the plug to the assembly, FIGS. 15 to 17 represent various steps in connecting the plug to the assembly, FIG. 15 being a sectional view taken along the line XV-XV in FIG. 14, FIG. 18 represents diagrammatically an operation of disconnecting the plug from the assembly.

DETAILED DESCRIPTION OF THE DRAWINGS

Figure 1:
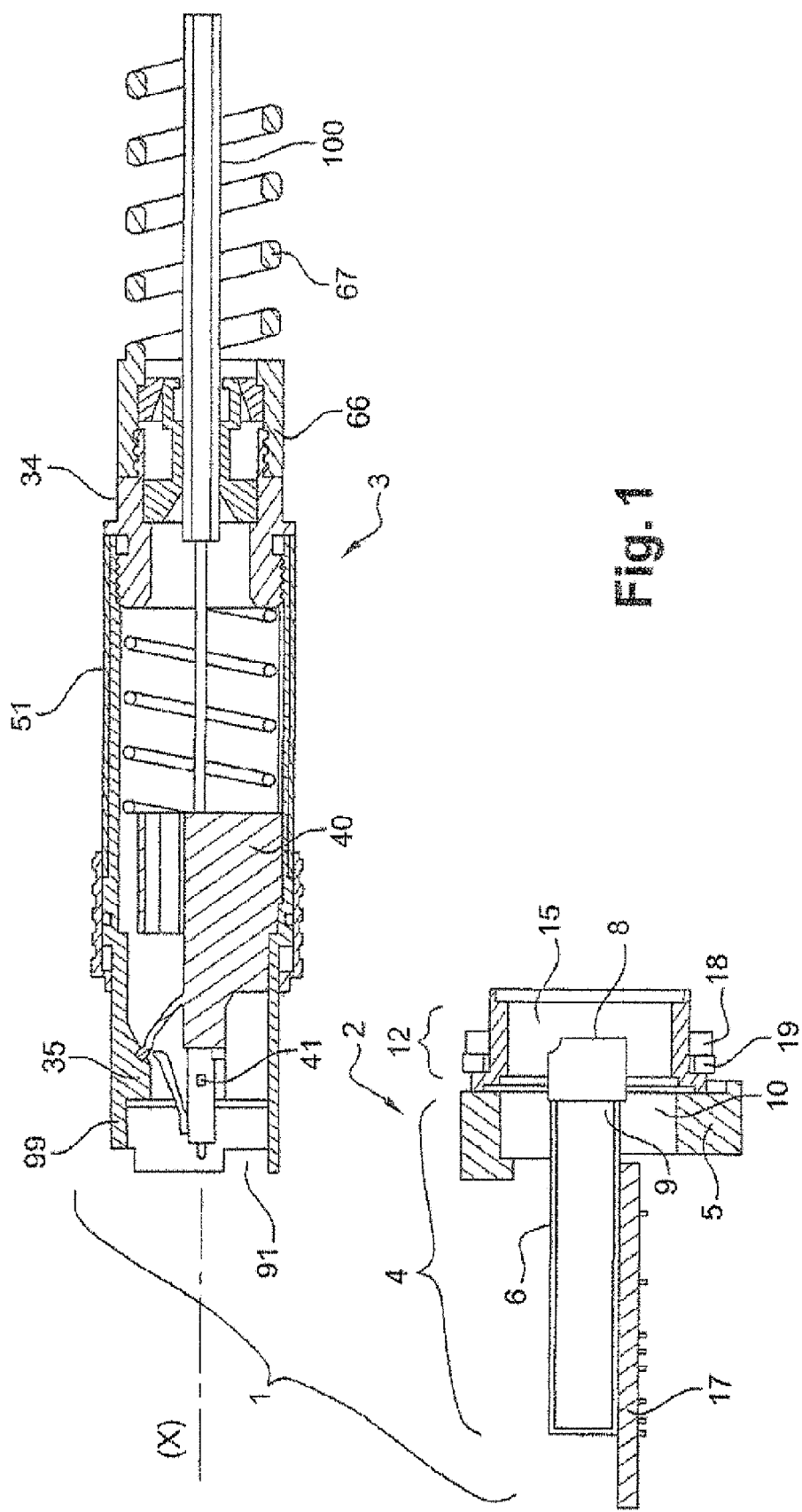
FIG. 1 represents diagrammatically an interconnection system of one embodiment of the invention comprising an assembly and a plug.

An interconnection system 1 of one embodiment of the invention is represented diagrammatically in FIG. 1.

The interconnection system 1 is for example a system for Ethernet applications in a severe outdoor environment.

The interconnection system 1 includes an assembly 2 and a plug 3, the plug 3 and the assembly 2 being configured to be connected to each other.

In the examples to be described, the interconnection system makes an optical connection, the plug being mounted on an optical cable 100, but the invention is not limited to such an example.

An assembly 2 according to the invention is described next with reference to FIGS. 2 to 8.

Figure 2:
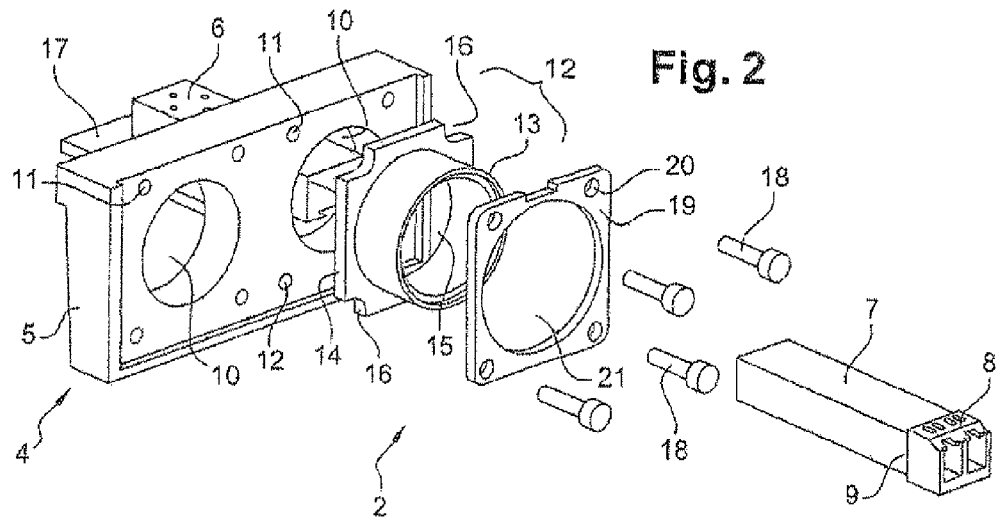
FIG. 2 is an exploded view of the assembly represented in FIG. 1.

In FIG. 2, this assembly 2 includes a customer equipment 4 comprising a chassis 5 and a casing 6 carried by the chassis 5, the casing 6 being adapted to receive in a housing 30 an electronic component 7 such as an opto-electronic converter, also known as a transceiver.

As represented in FIG. 1, a connection interface 8 is disposed at the end 9 of the component 7 received in an opening 10 provided in the chassis 5. This opening 10 is circular, for example, as may be seen in FIG. 2.

Figure 3:
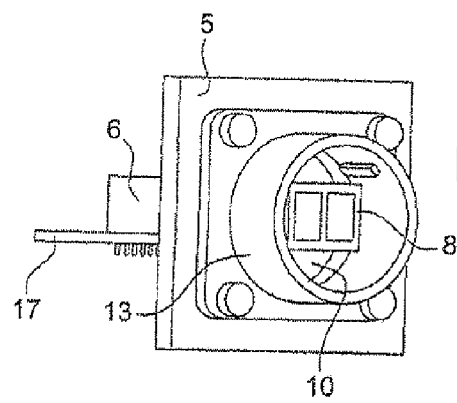
FIG. 3 is a perspective view of one example of an assembled assembly.
Figure 4:
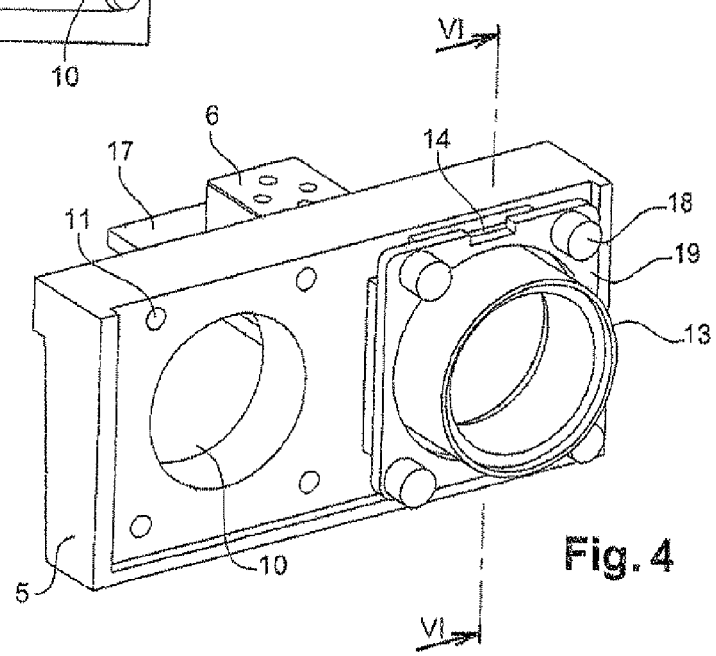
FIG. 4 shows a variant of the example represented in FIG. 3.

In the FIG. 2 example, the chassis includes two openings 10, but the invention is not limited to a particular number of openings. As represented in FIG. 3, the chassis 5 may include only one opening 10.

Holes 11 are produced in the thickness of the wall of the chassis 5 for fixing a base 12 as described hereinafter.

As shown in FIG. 2, the casing 6 may be mounted directly on a printed circuit card 17.

The socket 12 includes a tubular portion 13 and a plate 14 for fixing it to the chassis 5. The tubular portion 13 defines an opening 15 the diameter of which may be substantially equal to that of the opening 10 in the chassis 5. The plate 14 is of square or rectangular shape, for example, and cut-outs 16 may be provided at the corners of the plate 14 to allow screws 18 to pass through it to fix the socket 12 to the chassis 5.

In the FIG. 2 example, the assembly 2 includes a flange 19 having a substantially square or rectangular exterior contour and at its four corners holes 20 superposed on the cut-outs 16 of the plate 14 when the flange is mounted on the socket 12, the socket then being sandwiched between the flange 19 and the chassis 5.

This flange 19 has a circular opening 21 adapted to receive the tubular portion 13 of a socket 12.

As may be seen in the FIG. 2 example, the cut-outs 16 are oversized relative to the screws 18 to allow movement of the socket 12. In another embodiment, not shown, the assembly has no flange 19, the cut-outs 16 then being larger than when the flange 19 is present.

Figure 5:
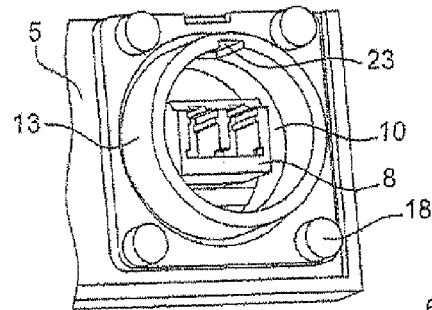
FIG. 5 is a view of a detail of the FIG. 2 assembly.

As may be seen in FIG. 5, a relief 23 such as a rib or a groove may be provided in the internal wall of the tubular portion 13, the function of this relief 23 being explained hereinafter.

Figure 6:
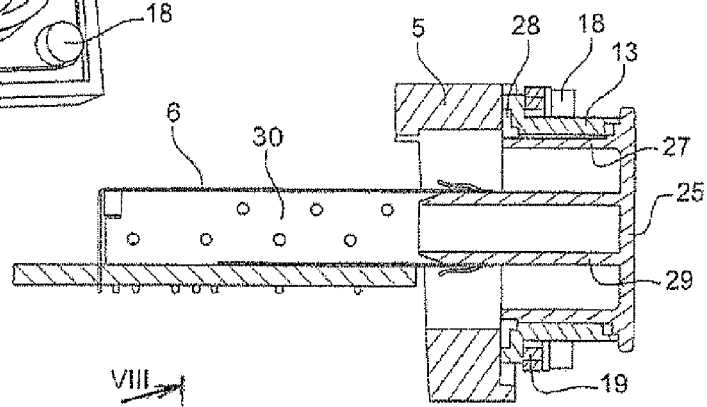
FIG. 6 is a sectional view taken along the line VI-VI in FIG. 4 with a cover added.
Figure 7:
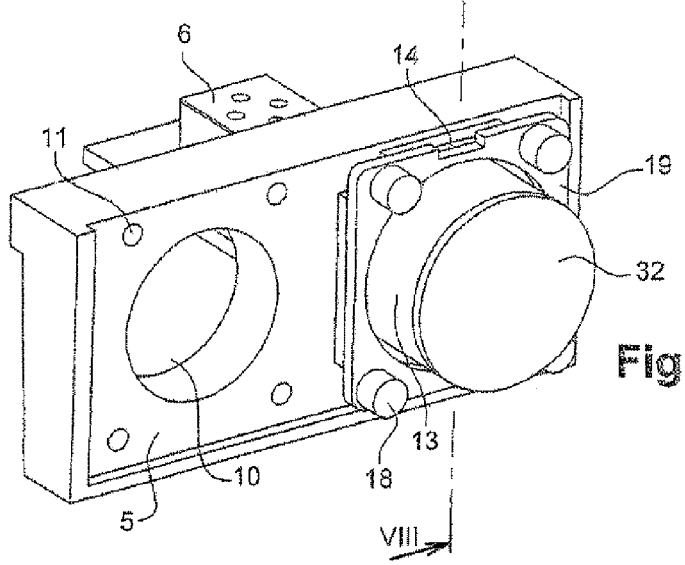
FIG. 7 represents the assembly from FIG. 4 when the cover has been fitted.
Figure 22:
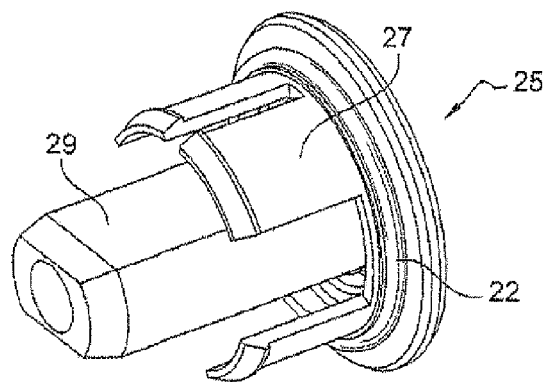
Figure 23:
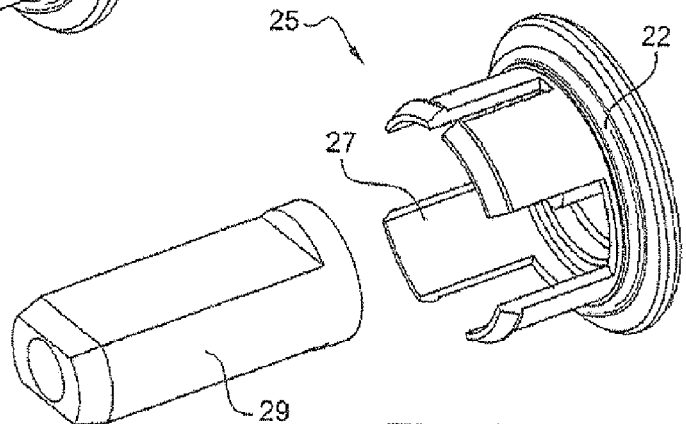

The socket 12 may further include a cover 25 one example of which is shown in section in FIG. 6. As shown in FIG. 6, this cover includes a tubular portion 27, the external wall of which is adapted to come into contact with the internal wall of the tubular portion 13 of the socket 12, and a peg 29 provided in a median region of the cover 25. As shown in FIGS. 22 and 23, the cover may include an annular seal 22 pressed externally against the base of the tubular portion 27. The cover 25 may be produced in metal or plastic coated with metal.

The peg 29 may be hollow as shown in FIG. 6 or solid as in the embodiment of FIGS. 22 and 23.

The peg 29 may be produced in one piece with the rest of the cover, as in the FIG. 6 embodiment, or removably fixed to the rest of the cover, as in the embodiment of FIGS. 22 and 23.

The peg 29 is disposed so as to extend toward the interior of the opening 10 of the chassis 5 when the cover 25 is in place on the socket 12 with the latter resting against the chassis 5.

It can be seen that the exterior dimensions of the peg 29 are chosen so that it is receivable inside the housing 30 provided in the casing 6 to centre the socket 12 relative to the casing 6 in a plane perpendicular to the plane of FIG. 6, to take account of the position of the casing 6 in this plane, which position may vary from one customer assembly to another. Once this centring has been effected, the socket 12 is fastened to the chassis 5 by the screws 18.

Figure 24:
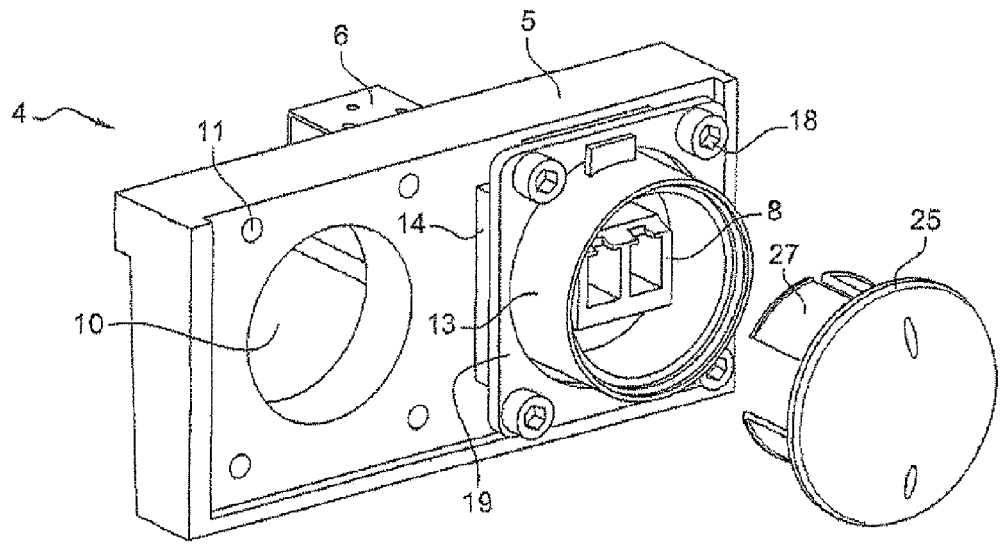
FIG. 24 is an overall view of an assembly with a cover from FIGS. 22 and 23.

With the socket 12 fixed to the chassis 5, the electronic module 7 may be disposed inside the housing 30 and the cover 25 with the removable peg 29 removed may be mounted on the socket to obstruct it, as shown in FIG. 24.

Figure 8:
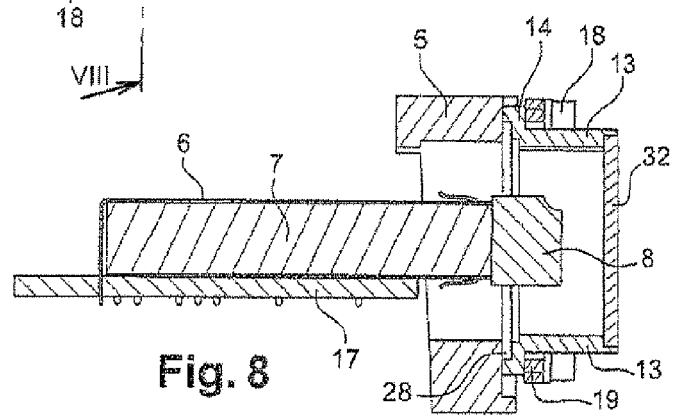
FIG. 8 is a sectional view taken along the line VIII-VIII in FIG. 7.

The assembly obtained may then be as shown in FIG. 8.

As may be seen in FIGS. 6 and 8, an annular groove 28 may be produced on the interior wall of the socket, level with the fixing plate 14.

A plug 3 of one embodiment of the invention is described next with reference to FIGS. 9 to 13.

The plug includes a body 33 that extends along a longitudinal axis X. This body 33 has a front portion, including a hollow part 35 extending along the axis X and of tubular shape in the example described here, and a rear portion 34. The part 35 is produced in plastic material, for example.

The front end 80 of the part 35 is configured to be inserted in the socket 12 as described above on connecting the plug to the assembly 2. At least one raised portion 90 projecting toward the interior of the part 35 may be carried by the part 35 in an area 99 at its front end 80. Cut-outs 91 may be produced at the front end 80 of the part 35, these cut-outs allowing reduction of the risk of the assembly 2 interfering with the printed circuit card on connecting the plug thereto.

The front portion of the part 35 may be covered by a metal envelope 81 including over a portion of its length a bead 82 projecting outward and having a holding area 39, produced by knurling, for example, or by the provision of a rough area. An annular seal 98 seen in FIGS. 15 to 21 may be disposed against the base of the bead 82.

Figure 9:
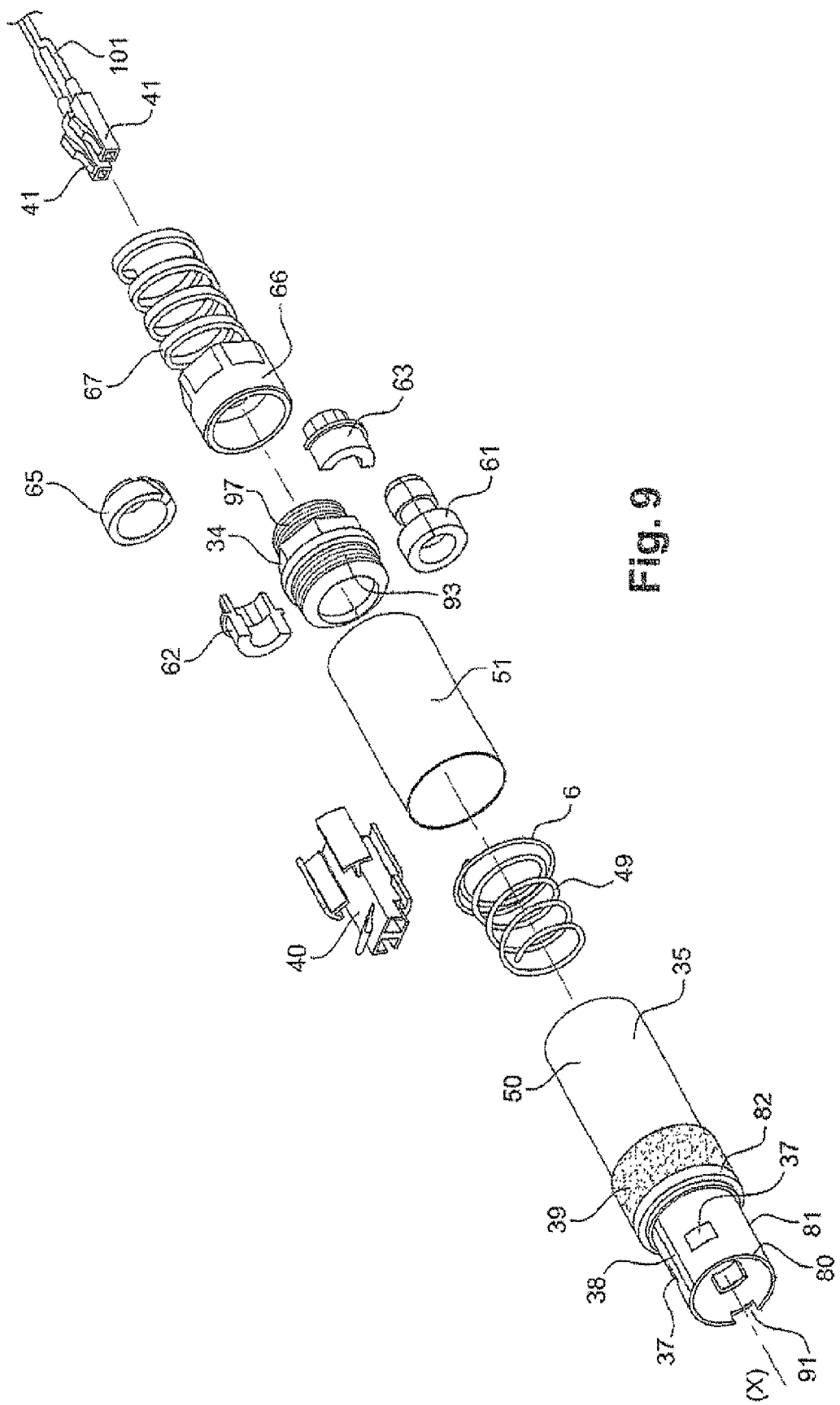
FIG. 9 is an exploded view of a plug of one embodiment of the invention.

As may be seen in FIG. 9, the front portion of the body 33 near the front end 80 of the part 35 may carry a raised portion 37 or a plurality of raised portions 37 disposed angularly around the axis X.

At least one raised portion 38, such as a rib, may be disposed over all or part of the length of the envelope 81. Such ribs are produced in one piece with the part 35, for example, and pass through openings provided in the envelope 81. An annular seal 86 is received in a housing provided in the exterior wall of the part 35, this seal 86 providing the seal between the part 35 and the metal envelope 81.

Figure 10:
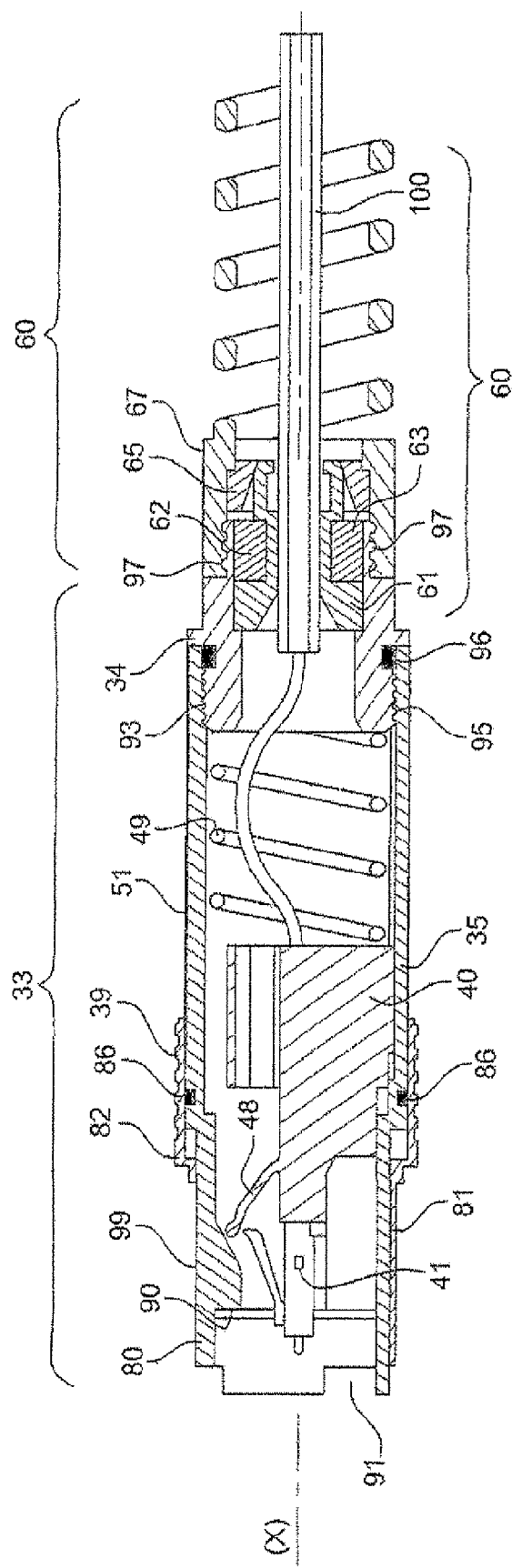
FIG. 10 is a sectional view of the plug represented in FIG. 9 when assembled.
Figure 19:
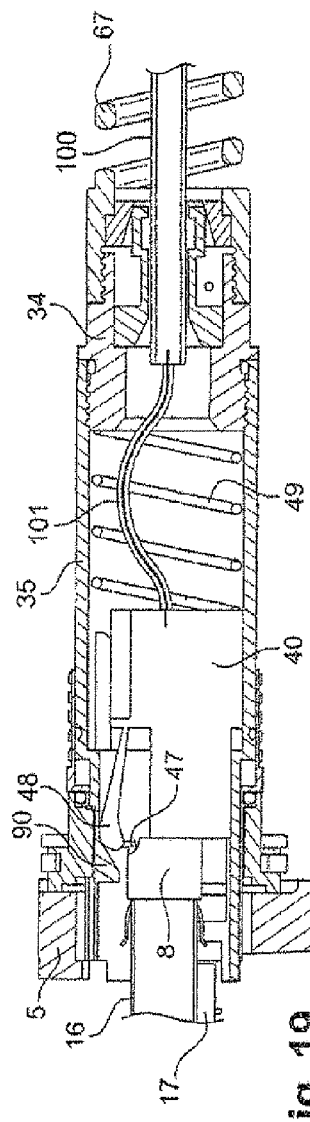
FIGS. 19 to 21 represent various steps during the disconnection of the plug from the assembly, FIG. 19 being a sectional view taken along the line XIX-XIX in FIG. 18, FIGS. 22 and 23 represent a cover of another embodiment of the invention.

As represented in FIG. 10, a support 40, which is for example a duplex support configured to carry two LC contacts 41, is disposed inside the hollow part 35. The support may include a lug 48 mounted to pivot relative to the rest of the support 40 about an axis Y1 perpendicular to the axis X of the part 35 and two housings 84, intended to receive each contact 41. The contacts 41 are mounted on optical conductors 101 of the optical cable 100.

The support 40 may further include arms 42 having an end surface 43 extending partway around the axis X and espousing the shape of the interior surface of the part 35, for example.

Guides may be provided on the interior wall of the part 35 to allow movement of the support 40 along the axis X inside the part 35.

As may be seen in FIG. 10, once the contacts 41 are in place in the body 33, the front end 80 of the hollow part 35 extends outwardly beyond the contacts 41 to protect the contacts 41 during operations of connecting and/or disconnecting the plug to/from the assembly 2. In a variant, the contacts may be protected by the metal envelope 81, which in that case is longer than the hollow part 35.

As represented in FIG. 11, each contact 41 may include at least one lug 47 on its upper surface 46, the lug 47 being mounted to pivot relative to the rest of the contact 41 about an axis Y2 perpendicular to the longitudinal axis X. The axes Y1 and Y2 are parallel, for example.

As shown in FIG. 13, once the contacts 41 are in place in the housings 84 of the support 40, the lug 48 of the support is situated above the lugs 47 of the contacts 41 so that after pivoting the lug 48 may come into contact with the lugs 47.

In the example shown the body 33 further includes a metal sleeve 51 covering the rear portion of the hollow part 35. This sleeve is of tubular shape, for example. Such a sleeve 51 may allow reduction of the risks of electromagnetic leaks.

The rear portion 34 of the body, 33 extends over the whole of the perimeter of the body, for example, and, as shown in FIG. 9, includes at a front end an exterior thread 93 intended to cooperate with a thread 95 provided at the rear end of the interior surface of the hollow part 35. The rear portion 34 may include an annular seal 96 extending over the whole of the perimeter of its exterior surface and an exterior thread 97 provided at the rear end of the rear portion 34.

As shown in FIG. 10, the plug 3 includes a spring 49 connected at one end to the rear portion 34 and at another end to the support 40 so that this spring 49 exerts an elastic return force on the support 40 along the axis X.

In the example described, the plug 3 further includes a gland 60 mounted on, for example screwed to, the rear portion 34 of the body 33.

The gland 60 includes for example a split seal 61 produced in silicone and providing a sealed connection to the optical cable 100.

In the example described, the gland 60 also includes two members 62 and 63 of corresponding shape intended to hold the seal 61 against the cable 100. In the example described, these members 62 and 63 are the same shape and may be produced in plastic material, in particular in one piece connected by a hinge.

In the example shown, the gland 60 further includes a split clamping cone 65 intended to retain the closed members 62 and 63 on the optical cable 100.

The gland 60 may further include a nut 66, for example produced in plastic material and including a front portion having an interior thread intended to cooperate with the thread 97 of the rear portion 34 of the body 33. In the example described, the nut 66 further includes a rear portion 67 taking the form of a flexible structure. This flexible structure is of helicoidal shape, for example, also referred to as a "pig's tail", for example.

As shown in FIG. 10, the optical conductors 101 of the optical cable 100 may follow a curve inside the body 33, this curve being more or less pronounced according to the position of the support 40 in the body 33.

One example of connecting the plug 3 to the assembly 2 as described above is described next.

At rest, the plug may be as shown in FIG. 15. For example, the spring 49 holds the support 40 in a position in which the raised portion 90 presses on the lug 48 and the lug 48 presses on the lug 47.

As shown in FIG. 14, the plug 3 is moved in translation by applying a force F until the front end 80 of the hollow part 35 of the body 33 is inserted into the tubular portion 13 of the socket 12. The aforementioned rib or ribs 38 may then cooperate with the aforementioned groove or grooves 23 to polarize the plug 3 relative to the socket 12.

As shown in FIG. 16, on insertion of the front portion of the body into the tubular portion 13 of the socket 12, the internal wall of the tubular portion 13 exerts a compression force on the raised portions 37. The force exerted on the lug 47 by the raised portion 90 via the lug 48 holds it in the lowered position. Alternatively, lowering of the lug 47 is effected by the connection interface 8 of the customer equipment 4 of the assembly 2 exerting a load on it.

The force exerted on the support 40 by the spring 49 allows connection of the contacts 41 to the connection interface 8.

When the raised portions 37 reach the groove 28 provided in the internal wall of the socket 12, they are no longer subjected to any compression force exerted by the tubular portion 13 and are able to clip into this groove 28. This clipping holds the plug 3 onto the assembly 2. Furthermore, the connection interface 8 exerts on the contacts 41 a force opposing the return force exerted by the spring 49 and causing a slight rearward movement of the support 40 and the contacts 41. The support is then in a position in the body 33 in which the raised portion 90 exerts no force on the lug 48. The latter then does not press on the lug 47, which is moreover not subjected to any load exerted by the connection interface 8. The lug 47 is then released and is able to pivot in turn, locking the contact 40 into the connection interface 8 of the customer equipment 4 of the assembly 2.

An abutment position of the movement of the plug 3 relative to the socket 2 may be defined by the closed end of the relief 23 provided on the internal wall of the tubular portion 13 of the socket. The interconnection system is then as shown in FIG. 17.

If the envelope 81 protects the contacts, its rearward movement during connection may be greater and allow elimination of all risk of interference with the printed circuit card of the assembly 2.

An example of the operation of disconnecting the interconnection system 1 that has just been described is described next with reference to FIGS. 18 to 21.

During this disconnection operation, the operator applies a traction force F' to the plug 3 via the holding area 39, transmitting pressure to the raised portions 37 of the hollow part 35. This pressure causes flexing of the raised portions 37, thus releasing them from the groove 28. This unclipping allows the body 33 to be released.

Figure 20:
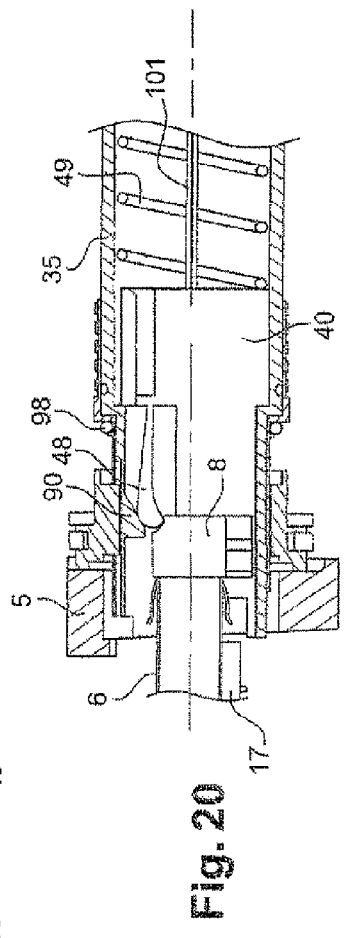
Figure 21:
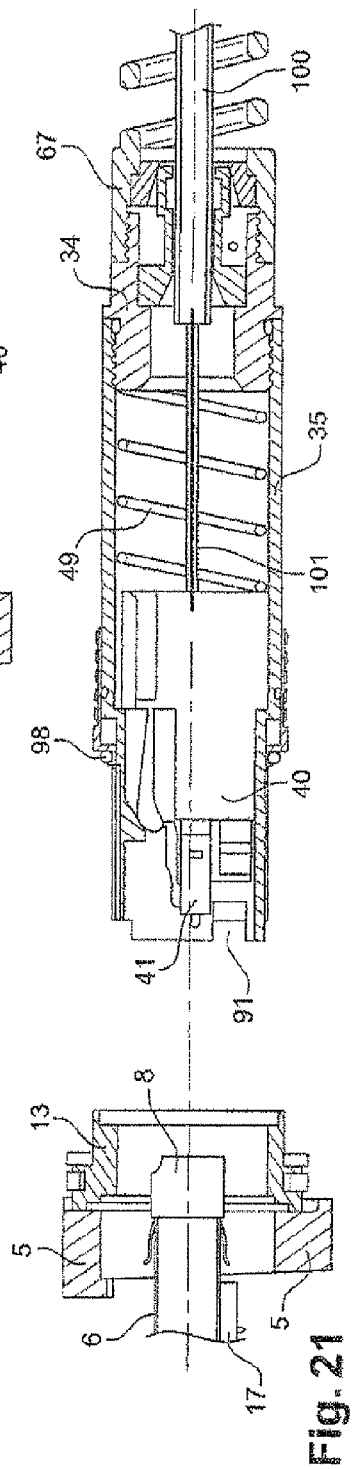

The force F' applied to the plug 3 entrains in translation the part 35 and thus the raised portion 90, which then comes to bear on the lug 48. The latter is then lowered, as shown in FIG. 20, in turn exerting pressure on the lug 47 of each of the contacts 41, leading to ejection of the contacts 41 from the connection interface 8 of the electronic component 7.

The invention allows blind connection of a plug to an electronic component received in a casing carried by a chassis of a customer equipment, taking account of differences in three dimensions of the position of the casing relative to the chassis.

The invention is not limited to the examples that have just been described.

The expression "including a" must be understood as being synonymous with "including at least one" unless otherwise indicated.

The invention claimed is:

1. A plug including:
   at least one contact connected to a cable, and
   a body extending along a longitudinal axis and inside which the contact is received,
   wherein
   the contact is carried by a support mobile in translation in the body, in that the contact includes a lug mounted to pivot relative to a remainder of the contact and the support includes a lug mounted to pivot relative to a remainder of the support, the lug of the contact and the lug of the support being adapted to come into contact with each other when the contact is mounted in the support, and
   the body has at one longitudinal end an area including at least one raised portion projecting toward an interior of the body, said raised portion and the lug of the support being adapted to come into contact with each other in at least one position of the support in the body.

2. The plug according to claim 1, further including means inside the body exerting a return force adapted to move the contact along the axis of the body.

3. The plug according to claim 2, wherein the support includes at least one arm extending along the axis of the body and having an end surface cooperating with guides produced in an interior wall of the body.

4. The plug according to claim 2, wherein said means include a spring having one end connected to the body and another end connected to the support.

5. The plug according to claim 1, further including a gland holding the plug on the cable.

6. The plug according to claim 5, wherein the gland includes on the cable:
   two retaining members of complementary shape,
   a member for clamping said two members, and
   a split seal.

7. An assembly configured to be connected to the plug according to claim 1, the assembly including:
   a customer equipment including a chassis and a casing adapted to receive an electronic component, said casing being carried by the chassis, defining a housing, and being disposed facing an opening of the chassis, and
   a socket including a tubular portion, a plate for fixing the socket to the chassis, and a cover adapted to obstruct the tubular portion,
   wherein the cover includes a peg adapted to extend toward the tubular portion when the cover is in place thereon, the peg being configured to cooperate with the housing of the casing to allow centring of the socket relative to the casing.

8. The assembly according to claim 7, wherein the peg is configured to be received inside the housing of the casing.

9. The assembly according to claim 7, wherein the peg is removably mounted on a remainder of the cover.

10. A method for mounting a socket on a chassis of a customer equipment to form the assembly according to claim 7,
    the method comprising:
    disposing the socket against the chassis in such a way that the peg cooperates with the housing of the casing, and the socket thus disposed is fixed to the chassis.

11. An interconnection system including:
    a plug according to claim 1; and
    an assembly configured to be connected to the plug, the assembly including:
    a customer equipment including a chassis and a casing adapted to receive an electronic component, said casing being carried by the chassis, defining a housing, and being disposed facing an opening of the chassis, and
    a socket including a tubular portion, a plate for fixing the socket to the chassis, and a cover adapted to obstruct the tubular portion,
    wherein the cover includes a peg adapted to extend toward the tubular portion when the cover is in place thereon, the peg being configured to cooperate with the housing of the casing to allow centring of the socket relative to the casing.

12. The system according to claim 11, wherein:
    an area of the body of the plug including at least one raised portion projecting toward the interior of the body includes at least one raised portion projecting towards an exterior of the body and the tubular portion of the socket includes a groove into which said raised portion may clip on connecting the plug and the socket.

13. The system according to claim 11, wherein:
    once a connection has been made the support is inside the body in a position in which the lug of the contact is released.

14. The system according to claim 11, wherein:
    an area of the body including the raised portion, the lug of the support, the lug of the contact, and a means exerting a return force adapted to move the contact along the axis of the body are configured so that when a traction force is applied to the plug to disconnect it from the assembly, the support moves in the body to a position in which, via the lug of the support, said raised portion holds the lug of the contact in a position allowing its disconnection from the assembly.

15. The system according to claim 11, wherein the body of the plug, respectively the socket, includes at least one rib and the socket, respectively the body of the plug, includes at least one groove, the groove and the rib being configured to provide polarization on connecting the plug to the socket.

16. The system according to claim 15, wherein the groove extends over only a portion of the body of the plug or the socket, the closed end of the groove defining an abutment position on connecting the plug to the socket.

* * * * *